United States Patent [19]
Yamamoto et al.

[11] Patent Number: 5,636,186
[45] Date of Patent: Jun. 3, 1997

[54] MULTIPLE AUDIO CHANNELS RECORDING AND REPRODUCTION APPARATUS

[75] Inventors: Kaoru Yamamoto, Tsurugashima; Takao Sawabe, Tokyo-to, both of Japan

[73] Assignee: Pioneer Electronic Corporation, Tokyo-to, Japan

[21] Appl. No.: 677,452

[22] Filed: Jul. 2, 1996

[30] Foreign Application Priority Data

Jul. 4, 1995 [JP] Japan ................. 7-169101

[51] Int. Cl.$^6$ .................................. H04B 1/20
[52] U.S. Cl. .............................. 369/4; 369/49
[58] Field of Search ................ 369/4, 3, 5, 49, 369/47, 48, 89, 90

[56] References Cited

U.S. PATENT DOCUMENTS

| | | | |
|---|---|---|---|
| 5,170,381 | 12/1992 | Taylor et al. | 369/4 |
| 5,367,506 | 11/1994 | Inanaga et al. | 369/4 |

FOREIGN PATENT DOCUMENTS

| | | | |
|---|---|---|---|
| 61-134966 | 6/1986 | Japan | 369/4 |
| 1276837 | 11/1989 | Japan | 369/4 |
| 4119399 | 4/1992 | Japan | 369/4 |

*Primary Examiner*—Tan Dinh
*Attorney, Agent, or Firm*—Morgan, Lewis and Bockius LLP

[57] ABSTRACT

Information data include audio information data corresponding to M (M: a natural number) types of audio information arbitrarily selected from N (N: a natural number not less than 3, and M≦N) types of audio information set in advance. An apparatus for recording the information data onto a record medium as groups of audio information data corresponding to the selected M types respectively, is provided with: a data generating device for generating record content information data to identify the selected M types of audio information; and a recording unit for recording the generated record content information data and the groups of audio information data corresponding to the generated record content information data onto the record medium.

11 Claims, 10 Drawing Sheets

FIG.10A

1st AUDIO STREAM Sa1

AUDIO INFORMATION ON EACH CHANNEL

| SCH1 | SCH2 | SCH3 | SCH4 | SCH5 | CORRESPONDING PURPOSE OF USAGE |
|---|---|---|---|---|---|
| MAIN PERFORMANCE | GM1+GM2 | V1 | V2 | | |
| ○ | ○ | ○ | | | SING NORMALLY BY TWO |
| ○ | ○ | | | | SING PRO-VERSION BY TWO |
| ○ | ○ | | ○ | | SING V2 PRO-VERSION ALONE |
| ○ | ○ | ○ | | | SING V1 PRO-VERSION ALONE |
| ○ | ○ | | ○ | ○ | LISTEN TO VOCAL OF V1, V2 |

FIG.10B

2nd AUDIO STREAM Sa2

AUDIO INFORMATION ON EACH CHANNEL

| SCH1 | SCH2 | SCH3 | SCH4 | SCH5 | CORRESPONDING PURPOSE OF USAGE |
|---|---|---|---|---|---|
| MAIN PERFORMANCE | EFFECTIVE SOUND | V1+GM2 | V2+GM1 | | |
| ○ | | | | | SING PRO-VERSION BY TWO |
| ○ | ○ | | | | SING PRO-VERSION WITH EFFECTIVE SOUND BY TWO |
| ○ | | ○ | | | SING V2 ALONE |
| ○ | ○ | ○ | | | SING V2 WITH EFFECTIVE SOUND ALONE |
| ○ | | | ○ | | SING V1 ALONE |
| ○ | ○ | | ○ | | SING V1 WITH EFFECTIVE SOUND ALONE |

FIG.10C

3rd AUDIO STREAM Sa3

AUDIO INFORMATION ON EACH CHANNEL

| SCH1 | SCH2 | SCH3 | SCH4 | SCH5 | CORRESPONDING PURPOSE OF USAGE |
|---|---|---|---|---|---|
| MAIN PERFORMANCE WITH EFFECTIVE SOUND | GM1+GM2 | V1 | V2 | | |
| ○ | ○ | ○ | | | SING ORDINALLY WITH EFFECTIVE SOUND BY TWO |
| ○ | ○ | | | | SING PRO-VERSION WITH EFFECTIVE SOUND BY TWO |
| ○ | ○ | | ○ | | SING V2 ON PRO-VERSION WITH EFFECTIVE SOUND ALONE |
| ○ | ○ | ○ | | | SING V1 ON PRO-VERSION WITH EFFECTIVE SOUND ALONE |
| ○ | ○ | | ○ | ○ | LISTEN TO VOCAL OF V1, V2 WITH EFFECTIVE SOUND |

MULTIPLE AUDIO CHANNELS RECORDING AND REPRODUCTION APPARATUS

BACKGROUND OF THE INVENTION

1. Field of the Invention

The present invention generally relates to an information recording apparatus and an information reproducing apparatus, and more particularly to an information recording apparatus for recording audio information and video information to a record medium such as an optical disk, and an information reproducing apparatus for reproducing the audio information and video information from the record medium.

2. Description of the Related Art

Audio information and video information are recorded on a record medium such as an optical disk, a video tape and the like.

The information may be recorded on such a record medium in a form of an analog signal or a digital signal. The method of recording the information by means of the digital signal is superior to that by means of the analog signal since the degradation in the sound quality and the image quality of the digital signal is less than that of the analog signal, and the digital signal can be more easily dealt with by the computer.

There is a multiple audio music accompaniment apparatus (hereinafter, it is called as a "karaoke apparatus") as an applied system by use of such a record medium, which records audio information of 4 channels (i.e. two audio main channels and two audio sub channels).

As one type of this karaoke apparatus, there is one which predetermines such a rule that the audio sub channels (i.e. the $3^{rd}$ and $4^{th}$ channels) are recorded with the model singing (i.e. the guide voice), so that the audio information including the model singing can be used for practice.

Therefore, in this type of karaoke apparatus, since the condition of using each channel is predetermined in advance, it is not necessary to record on the record medium the information describing the condition of using each channel. Thus, such information describing the condition of using each channel is not really recorded on the record medium.

On the other hand, as another type of the karaoke apparatus, there is one which records audio signals independent from each other to the 4 channels, records the accompaniment sound and the model singing corresponding to one of the two singers to the sub channels ($3^{rd}$ and $4^{th}$ channels) respectively in case of the duet karaoke music composition, and records the information as for the condition of using the audio channels for each music composition, on the record medium. In this case, the information recordable for each channel is predetermined in advance.

Since what is recorded to each audio channel (i.e. the channel format) is predetermined in advance in the above explained types of karaoke apparatus, the degree of freedom for recording and reproducing is certainly restricted, which is a problem.

Further, since the channel format is predetermined in advance, the record medium, which can be reproduced by one type of karaoke apparatus employing one type of channel format, cannot be reproduced by another type of karaoke apparatus employing another type of channel format as it is. In order to utilize the music composition on the record medium by this another type of karaoke apparatus, it is necessary to manufacture a new record medium based on this another type of channel format.

SUMMARY OF THE INVENTION

It is therefore an object of the present invention to provide an information record apparatus and an information reproducing apparatus, which can improve the degree of freedom and the flexibility in recording and reproducing the information, and which can be easily adapted for a record medium of multiple channel record type.

The above object of the present invention can be achieved by an apparatus for recording information data, which include audio information data corresponding to M (M: a natural number) types of audio information arbitrarily selected from N (N: a natural number not less than 3, and $M \leq N$) types of audio information set in advance, onto a record medium as groups of audio information data corresponding to the selected M types respectively. The recording apparatus is provided with: a data generating device for generating record content information data to identify the selected M types of audio information; and a recording unit for recording the generated record content information data and the groups of audio information data corresponding to the generated record content information data onto the record medium.

According to the recording apparatus of the present invention, the record content information data to identify the selected M types of audio information are generated by the data generating device. Then, the generated record content information data and the groups of audio information data corresponding to the generated record content information data are recorded by the recording unit onto the record medium. Consequently, on the basis of the record content information data recorded on the record medium, it is possible to easily recognize which type of audio information among the N types of audio information set in advance is recorded on the record medium. It is not necessary to record in advance the information as for the combination of the audio information which can be reproduced, and the flexibility of system construction at the time of reproduction is improved.

As one aspect of the recording apparatus of the present invention, the recording unit records one piece of the generated record content information data commonly for a plurality of groups of audio information data, which consist of the same type of audio information to each other.

According to this aspect of the recording apparatus, one piece of the generated record content information data is recorded commonly for a plurality of groups of audio information data, which consist of the same type of audio information to each other, by the recording unit. Thus, the record capacity of the record medium for the record content information data can be reduced while, on the basis of the record content information data, it is possible to easily recognize which type of audio information among the N types is recorded on the record medium. More information can be recorded on one record medium.

As another aspect of the recording apparatus of the present invention, in case of recording a plurality of groups of audio information data onto the record medium, the recording unit records a plurality of pieces of record content information data corresponding to the plurality of groups of audio information data collectively within a predetermined area on the record medium.

According to this aspect, in case of recording a plurality of groups of audio information data onto the record medium, a plurality of pieces of record content information data corresponding to the plurality of groups of audio information data are recorded collectively within a predetermined area on the record medium, by the recording unit. Thus, just by accessing the predetermined area on the record medium, the record content information data corresponding to a plurality of groups of audio information data can be obtained at a time of reproduction. It is possible to improve the processing speed at the time of reproduction.

As another aspect of the recording apparatus of the present invention, in case of recording a plurality of groups of audio information data onto the record medium, the recording unit records a plurality of pieces of record content information data corresponding to the plurality of groups of audio information data such that each piece of record content information data is added to one of the groups of audio information data corresponding to the each piece of record content information data, respectively.

According to this aspect of the present invention, in case of recording a plurality of groups of audio information data onto the record medium, a plurality of pieces of record content information data corresponding to the plurality of groups of audio information data are recorded by the recording unit such that each piece of record content information data is added to one of the groups of audio information data corresponding to the each piece of record content information data, respectively. Thus, when the group of audio information data is accessed, the corresponding audio content information data can be obtained at once at a time of reproduction. It is possible to let the system, which cannot store the audio content information with respect to all of the groups of audio information data, perform the same kind of operation As another aspect of the recording apparatus of the present invention, the recording unit is provided with an adder for adding the record content information data to the groups of audio information data, a modulator for modulating the added data, and a mastering device for recording the modulated data onto the record medium.

According to this aspect, the record content information data are added to the groups of audio information data by the adder, the added data are modulated by the modulator, and the modulated data are recorded onto the record medium by the mastering device. Thus, the record content information data can be easily recorded onto the record medium.

The above object of the present invention can be also achieved by a first reproducing apparatus for reproducing information data, which comprise (i) audio information data corresponding to M (M: a natural number) types of audio information arbitrarily selected from N (N: a natural number not less than 3, and M≦N) types of audio information set in advance, recorded as groups of audio information data corresponding to the selected M types respectively, and (ii) record content information data to identify the selected M types of audio information, from a record medium in a form of an arbitrary combination of the M types of audio information. The first reproducing apparatus is provided with: a reading unit for reading the groups of audio information data and the record content information data from the record medium; an identifying unit for identifying the M types of audio information which can be reproduced on the basis of the record content information data read by the reading unit; an instructing unit for instructing a desirable combination of the M types of audio information constituting the group of audio information data to be reproduced; and a signal processing unit for extracting the audio information data corresponding to the instructed desirable combination to be reproduced from the groups of audio information data read by the reading unit on the basis of an identification result by the identifying unit and an instruction by the instructing unit, and reproducing the extracted audio information data.

According to the first reproducing apparatus of the present invention, the groups of audio information data and the record content information data are read from the record medium by the reading unit. The M types of audio information, which can be reproduced on the basis of the record content information data read by the reading unit, are identified by the identifying unit. Along with this, a desirable combination of the M types of audio information constituting the group of audio information data to be reproduced is instructed by the instructing unit. Then, the audio information data corresponding to the instructed desirable combination to be reproduced are extracted from the groups of audio information data read by the reading unit, by the signal processing unit, on the basis of an identification result by the identifying unit and an instruction by the instructing unit. Finally, the extracted audio information data are reproduced by the signal processing unit. Consequently, on the basis of the record content information data recorded on the record medium, it is possible to reproduce an arbitrary combination of the M types of audio information constituting the groups of audio information data recorded on the record medium. It is not necessary to record in advance the information as for the combination of the audio information which can be reproduced, and the reproducing apparatus can be adapted to the diversification of reproduction manner.

As one aspect of the first reproducing apparatus of the present invention, the signal processing unit is provided with a demultiplexer for extracting the audio information data corresponding to the instructed desirable combination, an audio decoder for decoding the extracted audio information data, and a mixer for mixing-down the decoded audio information data on the basis of the instruction.

According to this aspect, the audio information data corresponding to the instructed desirable combination are extracted by the demultiplexer. Then, the extracted audio information data are decoded by the audio decoder. Finally, the decoded audio information data are mixed-down by the mixer on the basis of the instruction. Thus, on the basis of the record content information data recorded on the record medium, an arbitrary combination of the M types of audio information constituting the groups of audio information data recorded on the record medium can be easily and certainly reproduced.

As another aspect of the first reproducing apparatus of the present invention, it is further provided with a display unit for displaying a message to notify the audio information which can be combined to be reproduced, on the basis of the record content information data read by the reading unit.

According to this aspect, the message to notify the audio information, which can be combined to be reproduced, is displayed on the display unit. Thus, the user can easily recognize the allowable combination, and easily instruct the desirable combination of the audio information to be reproduced.

The above object of the present invention can be also achieved by a second reproducing apparatus for reproducing information data, which comprise (i) audio information data corresponding to $M_1, \ldots, M_L$ ($M_1, \ldots M_L$: a natural number, L: a natural number) types of audio information each arbitrarily selected from N (N: a natural number not less than 3, and $M_1, \ldots M_L \leq N$) types of audio information set in advance, each recorded as groups of audio information data corresponding to the selected $M_1, \ldots M_L$ types respectively, and (ii) L pieces of record content information data to respectively identify the selected $M_1, \ldots M_L$ types of audio information, from a record medium in a form of an arbitrary combination of the $M_1, \ldots M_L$ types of audio information. The second reproducing apparatus is provided with: a first instructing unit for instructing the group of audio information data to be reproduced: a reading unit for reading the instructed group of audio information data to be reproduced and the record content information data corresponding to the instructed group of audio information data from the record medium on the basis of an instruction by the first instructing unit; an identifying unit for identifying the audio information constituting the group of audio information data read by the reading unit on the basis of the record content information data read by the reading unit; a second instructing unit for instructing a desirable combination of the $M_1, \ldots M_L$ types of audio information constituting the group of audio information data to be reproduced; and a signal processing unit for extracting the audio information data corresponding to the instructed desirable combination to be reproduced from the group of audio information data read by the reading unit on the basis of an identification result by the identifying unit and an instruction by the second instructing unit, and reproducing the extracted audio information data.

According to the second reproducing apparatus of the present invention, the group of audio information data to be reproduced is instructed by the first instructing unit. The instructed group of audio information data to be reproduced and the record content information data corresponding to the instructed group of audio information data are read by the reading unit from the record medium on the basis of an instruction by the first instructing unit. Then, the audio information constituting the group of audio information data read by the reading unit is identified by the identifying unit, on the basis of the record content information data read by the reading unit. Along with this, a desirable combination of the $M_1, \ldots, M_L$ types of audio information constituting the group of audio information data to be reproduced is instructed by the second instructing unit. Then, the audio information data corresponding to the instructed desirable combination to be reproduced from the group of audio information data read by the reading unit are extracted by the signal processing unit on the basis of an identification result by the identifying unit and an instruction by the second instructing unit. Finally, the extracted audio information data are reproduced by the signal processing unit.

Consequently, on the basis of the record content information data recorded on the record medium, it is possible to select either one of the groups of audio information data, and reproduce an arbitrary combination of the $M_1, \ldots M_L$ types of audio information constituting the selected group of audio information data. It is not necessary to record in advance the information as for the combination of the audio information which can be reproduced, and the reproducing apparatus can be adapted to the diversification of reproduction manner, so that the corresponding audio information can be reproduced.

As one aspect of the second reproducing apparatus of the present invention, the signal processing unit is provided with a demultiplexer for extracting the audio information data corresponding to the instructed desirable combination, an audio decoder for decoding the extracted audio information data, and a mixer for mixing-down the decoded audio information data on the basis of the instruction. Thus, on the basis of the record content information data recorded on the record medium, an arbitrary combination of the $M_1, \ldots M_L$ types of audio information constituting the selected group of audio information data can be easily and certainly reproduced.

As another aspect of the second reproducing apparatus of the present invention, it is further provided with a display unit for displaying a message to notify the audio information which can be combined to be reproduced, on the basis of the record content information data read by the reading unit.

According to this aspect, the message to notify the audio information, which can be combined to be reproduced, is displayed on the display unit. Thus, the user can easily recognize the allowable combination, and easily instruct the desirable group and the desirable combination of the audio information to be reproduced.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 10, which consists of FIGS. 10A, 10B and 10C, are diagrams for explaining a relationship between a selected channel and a purpose of usage for each audio stream, wherein FIG. 10A explains a case of a $1^{st}$ audio stream Sa1, FIG. 10B explains a case of a $2^{nd}$ audio stream Sa2, and FIG. 10C explains a case of a $3^{rd}$ audio stream Sa3.

DETAILED DESCRIPTION OF THE PREFERRED EMBODIMENTS

Referring to the accompanying drawings, an embodiment of the present invention will be now explained.

(I) Information Recording Apparatus

Figure 1:
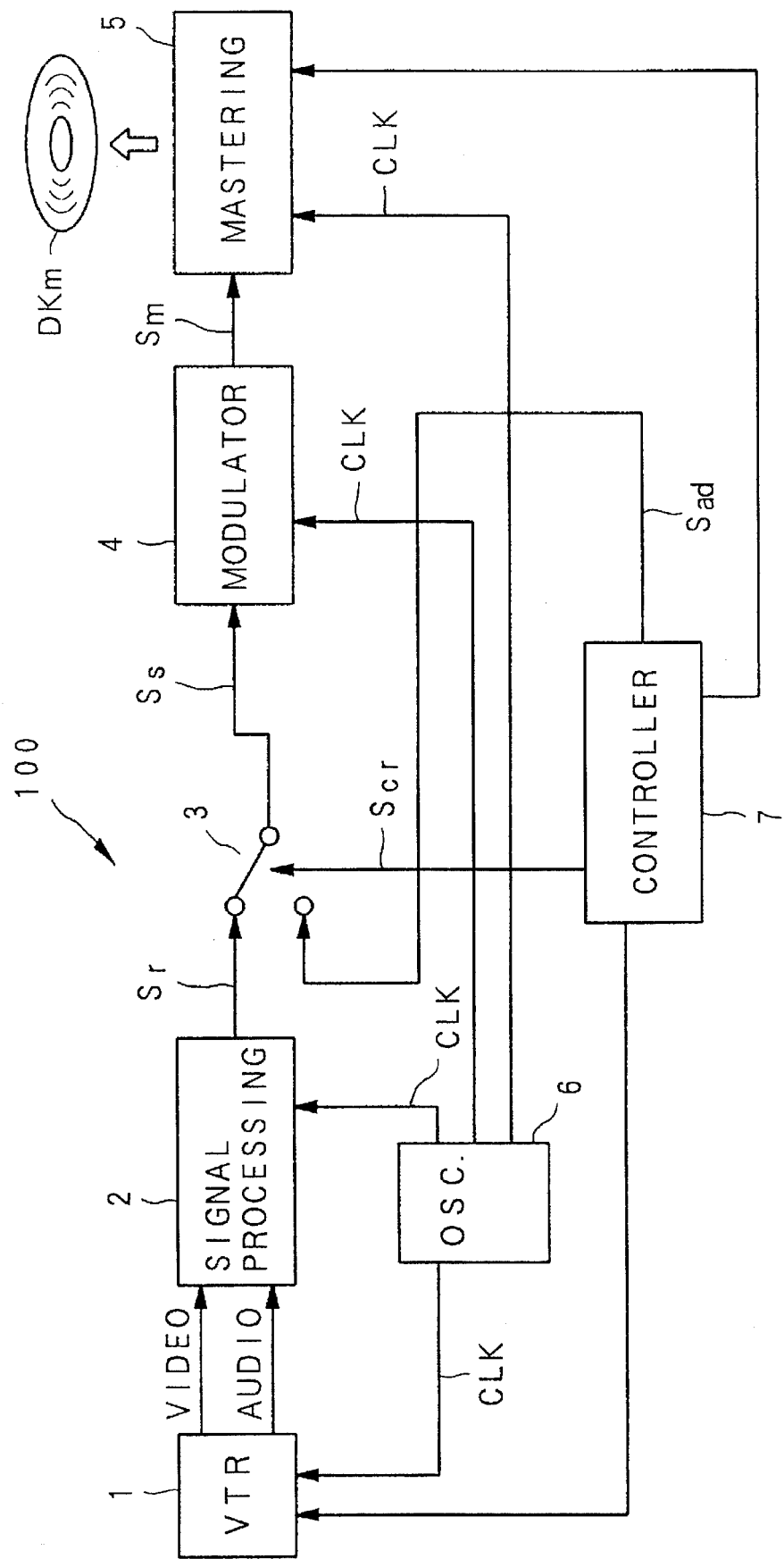
FIG. 1 is a block diagram of an information recording apparatus as an embodiment of the present invention.

FIG. 1 shows a construction of an information recording apparatus as an embodiment of the present invention.

In FIG. 1, an information recording apparatus is provided with a VTR (Video Tape Recorder) 1, a signal process section 2, an adder 3, a modulator 4, a mastering device 5, an oscillator (OSC) 6 and a controller 7.

The VTR 1 is adapted to record audio information and video information, which are to be recorded onto a master disk DKm, to a magnetic tape, and reproduce and output the recorded audio and video information from the magnetic tape.

The signal process section 2 A/D (Analog to Digital)-converts the audio and video information outputted from the VTR 1, applies a compression process by means of the MPEG (Moving Picture Experts Group) method or the like to the A/D-converted video information, and time-axis-multiplexing the A/D-converted audio information and the compressed video information to output a record information signal Sr. The adder 3 is adapted to switch on the basis of a control signal Scr from the controller 7 to time-axis-multiplex the record information signal Sr and an addition information signal Sad from the controller 7, to output a stream signal Ss. The modulator 4 adds an error correction code (ECC) such as a Reed Solomon code to the outputted stream signal Ss, and applies a modulation such as 2 to 3 modulation to it, so as to generate and output a disk record signal Sm.

The mastering device 5 records the disk record signal Sm onto the master disk DKm, based on which a stampers disk is manufactured to replicate a plurality of optical disks from it. The oscillator 6 generates and outputs a standard clock signal CLK to synchronize timings between the constitutional elements constituting the information recording apparatus 100.

The controller 7 generates and outputs the addition information signal Sad corresponding to addition information such as access information and the like, and performs an overall control of the information recording apparatus 100.

Next, the operation of the information recording apparatus 100 will be explained.

The audio information and video information outputted from the VTR 1 are A/D-converted by the signal process section 2. The A/D-converted video information is compressed by the MPEG method, and the compressed video information and the A/D converted audio information are time-axis multiplexed by the signal process section 2, to be the record information signal Sr outputted to the adder 3.

In parallel to this process, the addition information signal Sad is outputted from the controller 7 to the adder 3.

By those processes, the stream signal Ss is generated by the adder 3 by time-axis multiplexing the record information signal Sr and the addition information signal Sad, and is outputted to the modulator 4.

Then, the modulator 4 adds the error correction code (ECC) such as a Reed Solomon code onto the stream signal Ss, and applies the modulation such as a 2 to 3 modulation to it. Finally, the modulated disk record signal Sm is recorded to the master disk DKm by the mastering device 5. A stamper disk based on the master disk DKm is manufactured, and the replica disks as the optical disks for sale, are manufactured by a replication device, which is not shown.

Next, the information record format of an optical disk DK, which is replicated from the master disk DKm recorded in the above described manner, will be explained with referring to FIGS. 2 to 5.

Figure 2:
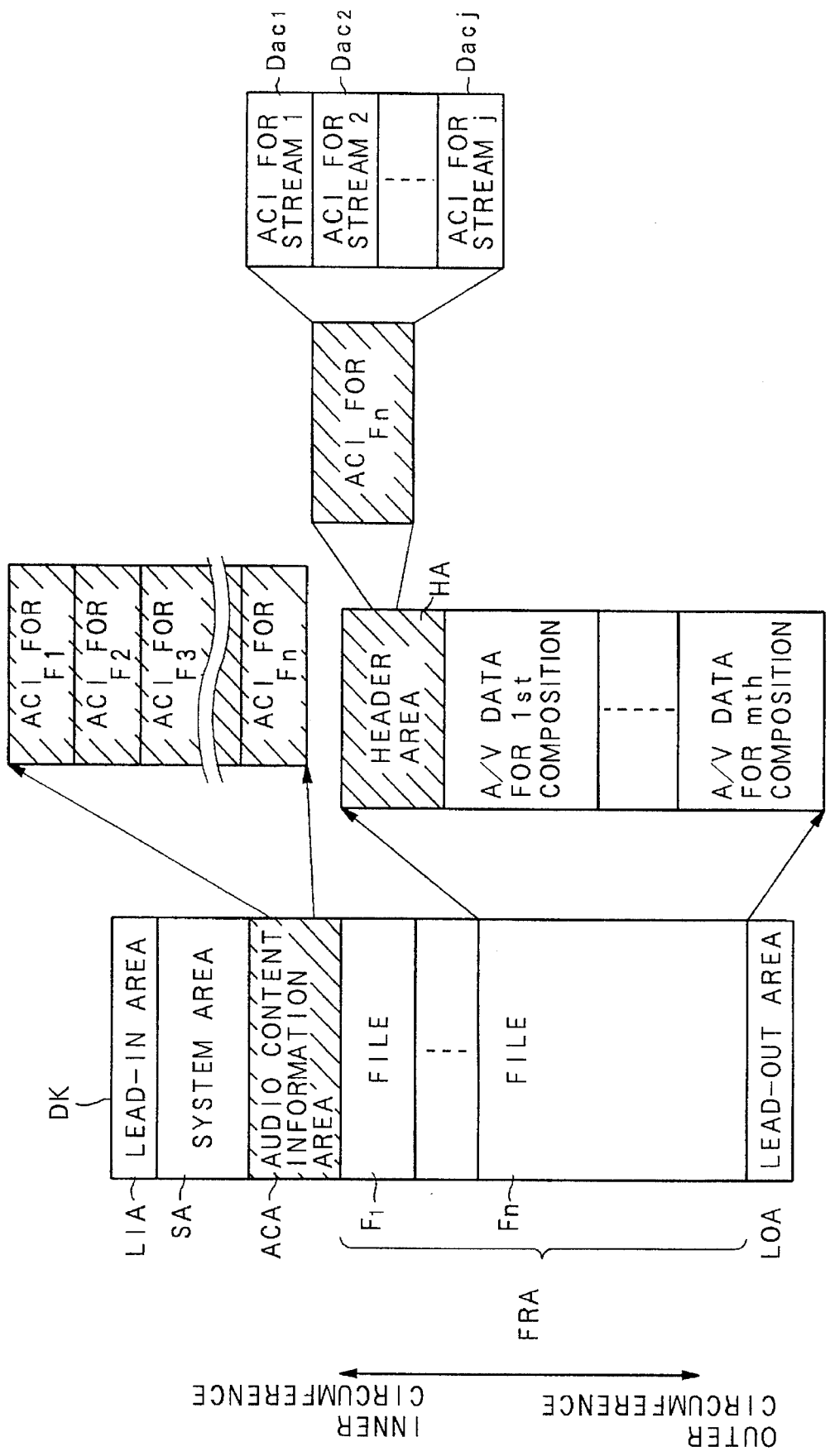
FIG. 2 is a diagram for explaining a condition of recording information on an optical disk in the embodiment.

In FIG. 2, the information record area on the optical disk DK is provided with, in the order from the inner circumference side to the outer circumference side thereof: a lead-in area LIA which indicates a record starting position of the information; a system area SA to which various system information such as record addresses and the like is recorded; an audio content information area ACA to which audio content information data for each file including the audio information data group and the video information data are recorded; a file record area FRA to which a plurality of files F1 to Fn are recorded; and a lead-out area LOA which indicates a record ending position of the information.

In the audio content information area ACA, there are n blocks of audio content information data, which indicate audio content information (ACI) for the files F1 to Fn (n: natural number not less than 2) respectively.

At a lead portion of each of the files F1 to Fn there is a header area HA, to which various information related to the corresponding file is recorded. In the header area HA, there is recorded the audio content information (ACI) data, which is the same as that recorded in the audio content information area ACA, corresponding to the pertinent file.

To each of the files F1 to Fn, it is possible to record j audio streams Sa1 to Saj (j: a natural number not less than 1 and not more than 8). Therefore, to the audio content information of each file and also in the audio content information corresponding to each file, the audio content information data Dac1 to Dacj corresponding to each audio stream are recorded.

As shown in FIG. 2, the audio and video data (A/V data) corresponding to one music composition are basically recorded to one of the files F1 to Fn respectively. However, if there are a plurality of music compositions which have the audio content information data same to each other, it is possible to record the video data and the audio data for m (m: a natural number not less than 2) music compositions with respect to the same common audio content information.

By this, it is enough to reproduce the music composition by use of the same common audio content information data with respect to the audio data and video data for m music compositions. Thus, the record capacity of the optical disk DK can be efficiently saved.

Figure 8:
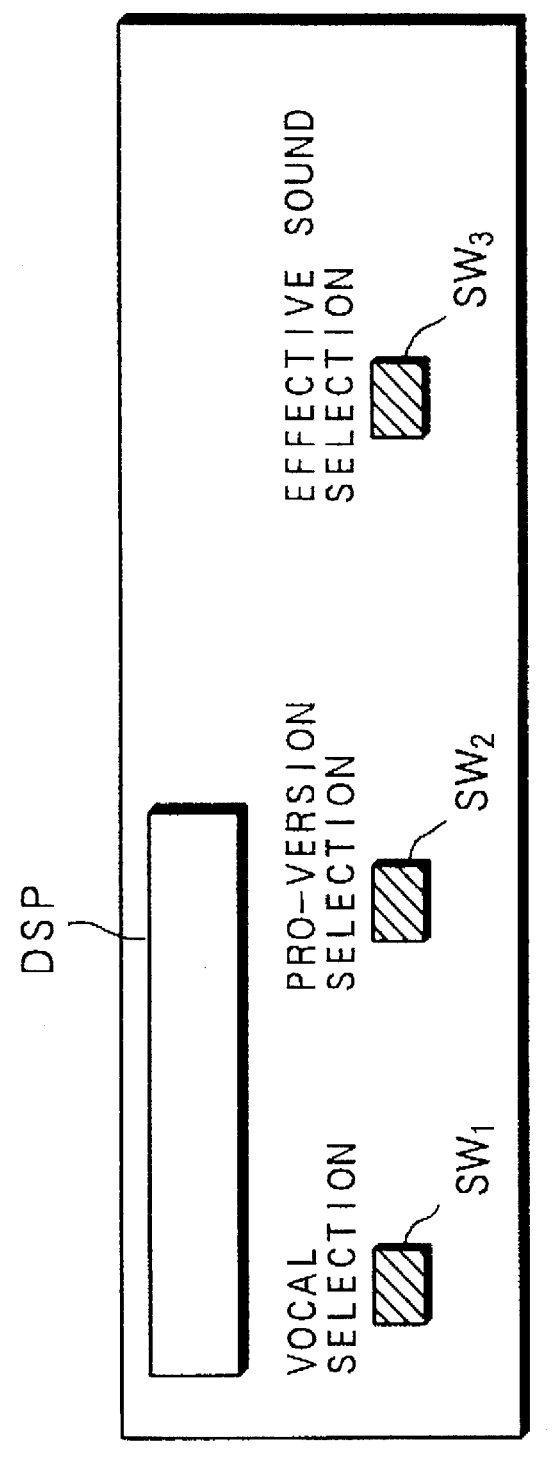
FIG. 8 is a front view of an operation section of the information reproducing apparatus of FIG. 6.

FIG. 8 shows a data construction of the audio content information data in case of constructing the audio content information data by 8 byte data based on the AC3 standard.

Figure 3:
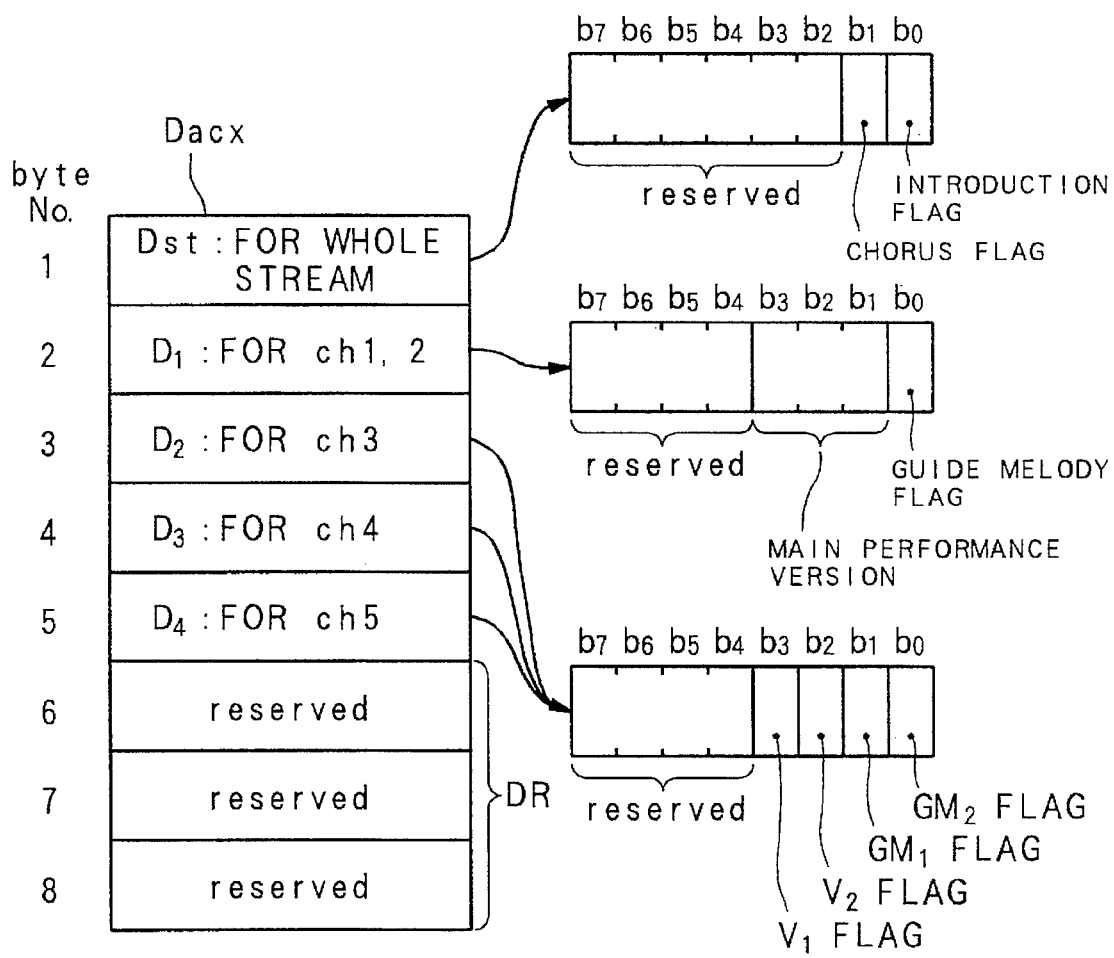
FIG. 3 is a diagram for explaining a data construction of audio content information consisting of 8 byte data in the embodiment.

In FIG. 3, the audio content information data Dacx is provided with: stream data Dst of 1 byte (byte No. 1), to which the information related to a whole portion of each audio stream Sx is recorded: first audio content data D1 of 1 byte (byte No. 2), to which the information related to the $1^{st}$ and $2^{nd}$ channels among 5 channels used for the AC3 standard is recorded; second audio content data D2 of 1 byte (byte No. 3), to which the information related to the $3^{rd}$ channel for the AC3 standard is recorded; third audio content data D3 of 1 byte (byte No. 4), to which the information related to the $4^{th}$ channel for the AC3 standard is recorded; fourth audio content data D4 of 1 byte (byte No. 5), to which the information related to the $5^{th}$ channel for the AC3 standard is recorded: and reserved data DR of 3 bytes (byte No. 6 to 8), which are used as the reserved area.

In the stream data Dst, a first bit b0 is assigned to an introduction flag indicating whether or not the corresponding stream includes the introduction information, a second bit b1 is assigned to a chorus flag indicating whether or not the corresponding stream Ss includes the chorus information, and 6 bits of a third bit b2 to an eighth bit b7 are used as the reserved area.

In the first audio content data D1, a first bit b0 is assigned to a guide melody flag indicating whether or not the corresponding $1^{st}$ and $2^{nd}$ channels include the guide melody information, 3 bits of a second bit b1 to a fourth bit b3 are assigned to version data indicating the version of main performance of the corresponding $1^{st}$ and $2^{nd}$ channels (e.g. the Orchestral version, the rock version), and 4 bit of a fifth bit b4 to an eighth bit b7 are used as the reserved area.

The second audio content data D2 to the fourth audio content data D4 have data constructions same to each other. Thus, the data construction of the second audio content data D2 are explained here.

In the second audio content data D2, a first bit b0 is assigned to a second guide melody flag indicating whether or not a second guide melody GM2 exists in the $3^{rd}$ channel, a second bit b1 is assigned to a first guide melody flag indicating whether or not a first guide melody GM1 exists in the $3^{rd}$ channel, a third bit b2 is assigned to a second vocal audio flag indicating whether or not a second vocal audio V2 exists in the $3^{rd}$ channel, a fourth bit b3 is assigned to a first vocal flag indicating whether or not a first vocal audio V1 exists in the $3^{rd}$ channel, and 4 bits of a fifth bit b4 to an eight bit b7 are used as the reserved area.

Figure 4:
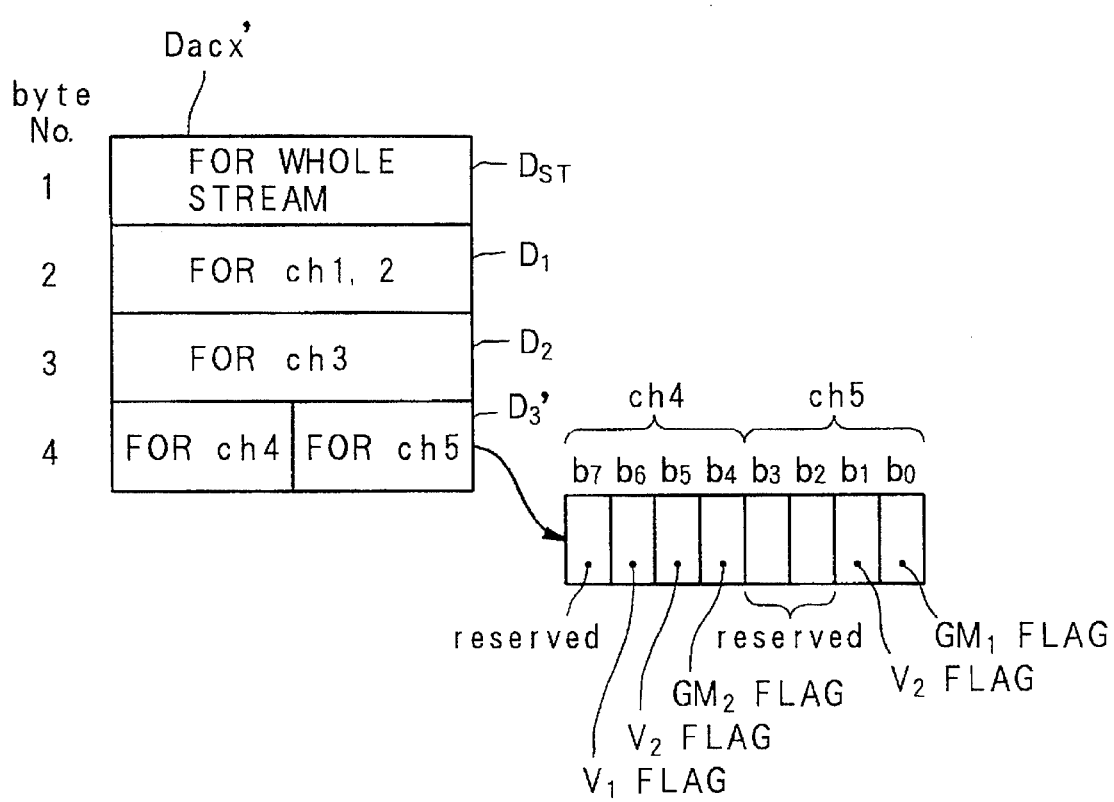
FIG. 4 is a diagram for explaining a data construction of audio content information consisting of 4 byte data in the embodiment.

FIG. 4 shows a data construction of the audio content information data in case of constructing the audio content information data by 4 byte data based on the AC3 standard.

In FIG. 4, the audio content information data Dacx' is provided with: stream data Dst of 1 byte (byte No. 1), to which the information related to a whole portion of each audio stream Sx is recorded; first audio content data D1 of 1 byte (byte No. 2), to which the information related to the $1^{st}$ and $2^{nd}$ channels among 5 channels used for the AC3 standard is recorded; second audio content data D2 of 1 byte (byte No. 3), to which the information related to the $3^{rd}$ channel for the AC3 standard is recorded; and third audio content data D3' of 1 byte (byte No. 4), to one half of which the information related to the $4^{th}$ channel for the AC3 standard is recorded and to another half of which the information related to the $5^{th}$ channel for the AC3 standard is recorded.

Here, the stream data Dst, the first audio content data D1 and the second audio content data D2 of FIG. 4 are the same as those in FIG. 3. Thus, the explanations thereof are omitted, while the data construction of the third audio content data D3' are explained here in detail.

The third audio content data D3' are roughly divided such that the first bit b0 to the fourth bit b3 thereof are used as a $5^{th}$ channel data area, and that the fifth bit b4 to the eighth bit b7 thereof are used as a $4^{th}$ channel data area.

In the $5^{th}$ channel data area, the first bit b0 is assigned to the first guide melody flag indicating whether or not the first guide melody GM1 exists in the $5^{th}$ channel, the second bit b1 is assigned to the second vocal audio flag indicating whether or not the second vocal audio V2 exists in the $5^{th}$ channel, and 2 bits of the third and fourth bits b2 and b3 are used as the reserved area.

In the $4^{th}$ channel data area, the fifth bit b4 is assigned to the second guide melody flag indicating whether or not the second guide melody GM2 exists in the $4^{th}$ channel, the sixth bit b5 is assigned to the second vocal audio flag indicating whether or not the second vocal audio V2 exists in the $4^{th}$ channel, the seventh bit b6 is assigned to the first vocal audio flag indicating whether or not the first vocal audio V1 exists in the $4^{th}$ channel, and the eighth bits b7 is used as the reserved area.

Figure 5:
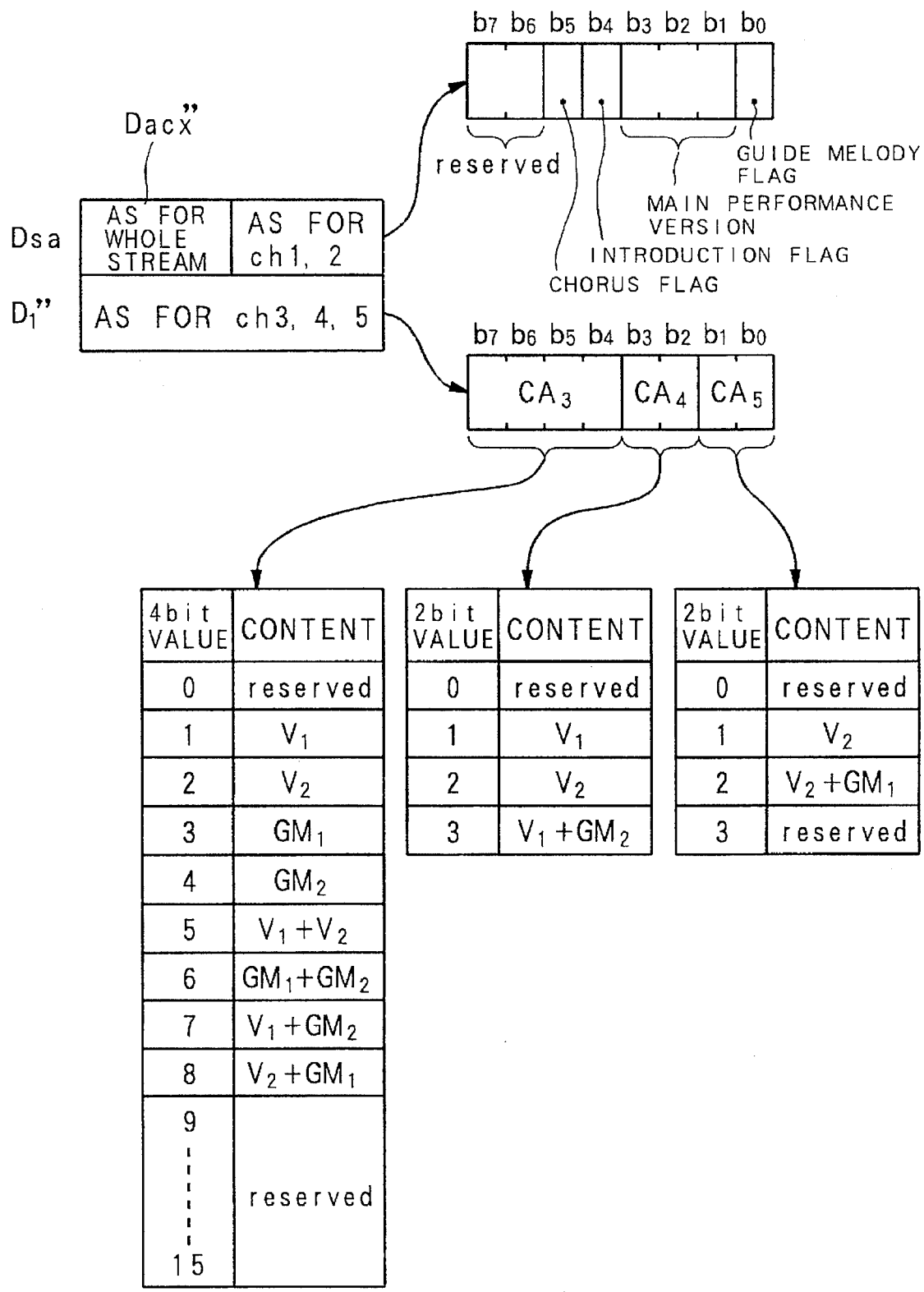
FIG. 5 is a diagram for explaining a data construction of audio content information consisting of 2 byte data in the embodiment.

FIG. 5 shows a data construction of the audio content information data in case of constructing the audio content information data by 2 byte data based on the AC3 standard.

In FIG. 5, the audio content information data Dacx" is provided with: stream audio content data Dsa of 1 byte (byte No. 1), to which the information related to a whole portion of each audio stream Sax and the information related to the $1^{st}$ and $2^{nd}$ channels among 5 channels used for the AC3 standard are recorded; and first audio content data D1" of 1 byte (byte No. 2), to which the information related to the $3^{rd}$, $4^{th}$ and $5^{th}$ channels for the AC3 standard is recorded.

In the stream audio content data Dsa, a first bit b0 is assigned to the guide melody flag indicating whether or not the corresponding $1^{st}$ and $2^{nd}$ channels include the guide melody information, 3 bits of a second bit b1 to a fourth bit b3 are assigned to version data indicating the version of main performance of the corresponding $1^{st}$ and $2^{nd}$ channels, a fifth bit b4 is assigned to the introduction flag indicating whether or not the corresponding stream Ss includes the introduction information, a sixth bit b5 is assigned to the chorus flag indicating whether or not the corresponding stream Ss includes the chorus information, and 2 bits of a seventh bit b6 to an eighth bit b7 are used as the reserved area.

In the first audio content data D1", 2 bits of a first bit b0 and a second bit b1 are used as a $5^{th}$ channel data area CA5 to which information related to the $5^{th}$ channel for the AC3 standard is recorded, 2 bits of a third bit b2 and a fourth bit b3 are used as a $4^{th}$ channel data area CA4 to which information related to the $4^{th}$ channel for the AC3 standard is recorded, and 4 bits of a fifth bit b4 to an eighth bit b7 are used as a $3^{rd}$ channel data area CA3 to which information related to the $3^{rd}$ channel for the AC3 standard is recorded.

Here, the usage of the $3^{rd}$, $4^{th}$ and $5^{th}$ channel data areas CA3, CA4 and CA5 is explained.

The $3^{rd}$ channel data area CA3 is used as listed below for example, by means of the values expressed by 4 bits constituting it.

| Value of 4 bits | meaning |
| --- | --- |
| 0 | system reserved value |
| 1 | $1^{st}$ vocal audio V1 exist |
| 2 | $2^{nd}$ vocal audio V2 exist |
| 3 | $1^{st}$ guide melody GM1 exist |
| 4 | $2^{nd}$ guide melody GM2 exist |
| 5 | $1^{st}$ and $2^{nd}$ vocal audios V1 and V2 exist |
| 6 | $1^{st}$ and $2^{nd}$ vocal audios GM1 and GM2 exist |
| 7 | $1^{st}$ vocal audio V1 and $2^{nd}$ guide melody GM2 exist |
| 8 | $2^{nd}$ vocal audio V2 and $1^{st}$ guide melody GM1 exist |
| 9 to 15 | system reserved value |

The $4^{th}$ channel data area CA4 is used as listed below for example, by means of the values expressed by 2 bits constituting it.

| Value of 2 bits | meaning |
| --- | --- |
| 0 | system reserved value |
| 1 | $1^{st}$ vocal audio V1 exist |
| 2 | $2^{nd}$ vocal audio V2 exist |
| 3 | $1^{st}$ vocal audio V1 and $2^{nd}$ guide melody GM2 exist |

The $5^{th}$ channel data area CA5 is used as listed below for example, by means of the values expressed by 2 bits constituting it.

| Value of 2 bits | meaning |
| --- | --- |
| 0 | system reserved value |
| 1 | $2^{nd}$ vocal audio V2 exist |
| 2 | $2^{nd}$ vocal audio V2 and $1^{st}$ guide melody GM1 exist |
| 3 | system reserved value |

The above explained data constructions of the audio content information data are some examples, and they are not limited to those examples.

By recording the information on the optical disk in the above described manner, it is possible to easily recognize which type of audio information is recorded among a plurality of predetermined types of audio information on the basis of the recorded content information data.

(II) Information Reproducing Apparatus

Next, an information reproducing apparatus for reproducing the information from the optical disk, which has been recorded by the above described information recording apparatus, will be explained with referring to FIGS. 6 to 10.

Figure 6:
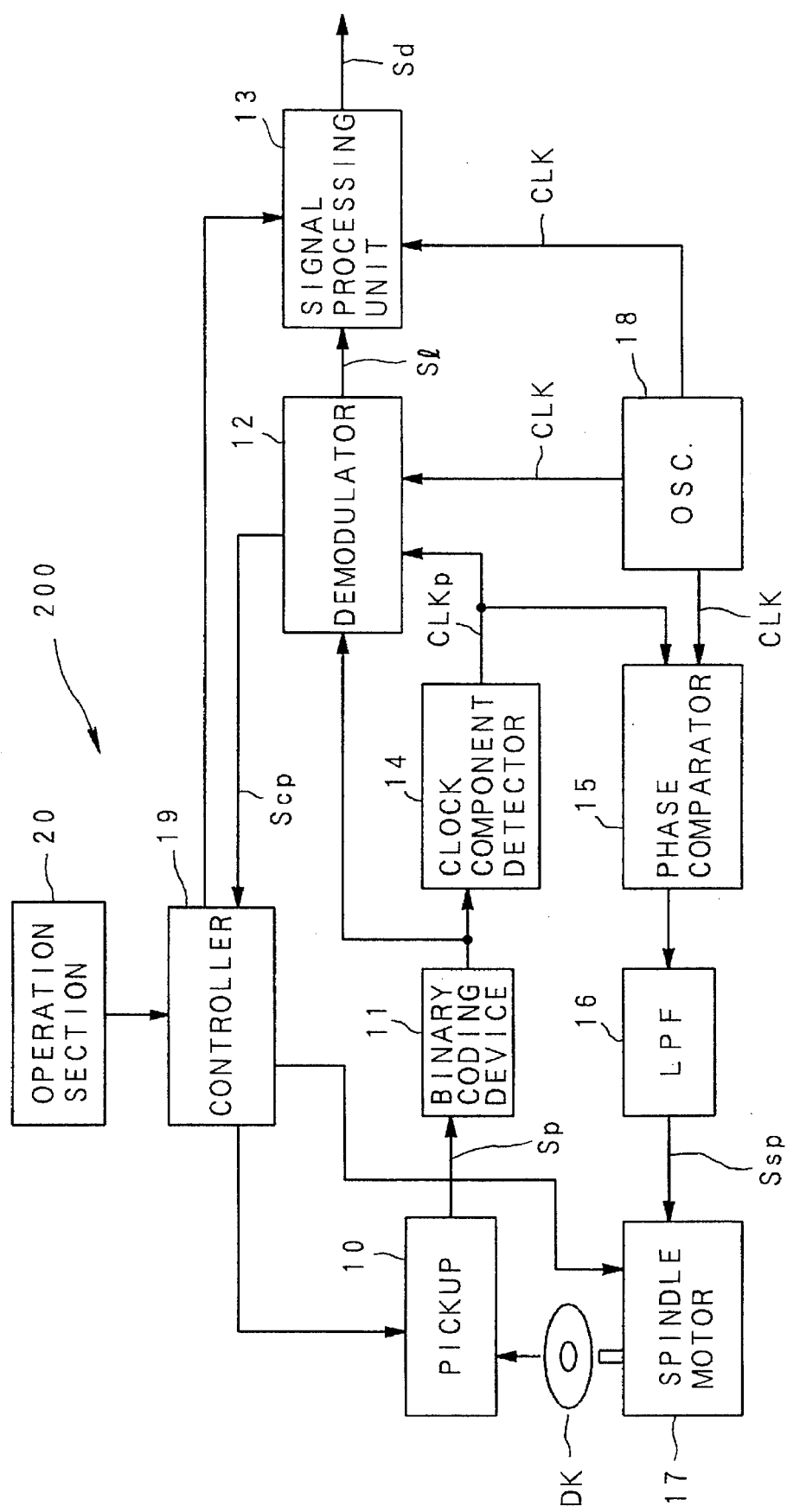
FIG. 6 is a block diagram of an information reproducing apparatus as the embodiment of the present invention.

In FIG. 6, an information reproducing apparatus 200 is provided with an optical pickup 10, a binary coding device 11, a demodulator 12, a signal process section 13, a clock component detector 14, a phase comparator 15, a low pass filter (LPF) 16, a spindle motor 17, an oscillator (OSC) 18, a controller 19 and an operation section 20.

The optical pickup 10 is adapted to detect the disk record signal Sm including the record information signal Sr and the addition information signal Sad from the optical disk DK, which has been recorded (replicated) by use of the aforementioned information recording apparatus 100, and output it as a detection signal Sp. The binary coding device 11 binary-codes the detection signal SD by use of a predetermined threshold. The demodulator 12 applies a demodulation process and an error correction process onto the binary-coded detection signal Sp, and outputs it as a reproduction information S1. The signal process section 13 applies an extending process based on the MPEG method onto the reproduction information S1, D/A converts it and outputs it as an output signal Sd.

The clock component detector 14 extracts a clock component from the binary-coded detection signal Sp, and outputs it as an extracted clock signal CLKp. The phase comparator 15 performs the phase comparison between the extracted clock signal CLKD and a standard clock signal CLK from the oscillator 18, and outputs a comparison signal. The low pass filter (LPF) 16 removes the high frequency component from this comparison signal, and outputs it as a control signal Ssp for a rotation control of the spindle motor 17. The spindle motor 17 rotation-drives the optical disk DK on the basis of the control signal Ssp.

The oscillator 18 generates and outputs the standard clock signal CLK to synchronize the timings between the constitutional elements of the information reproducing apparatus 200. The controller 19 performs an overall control of the information reproducing apparatus 200.

Figure 7:
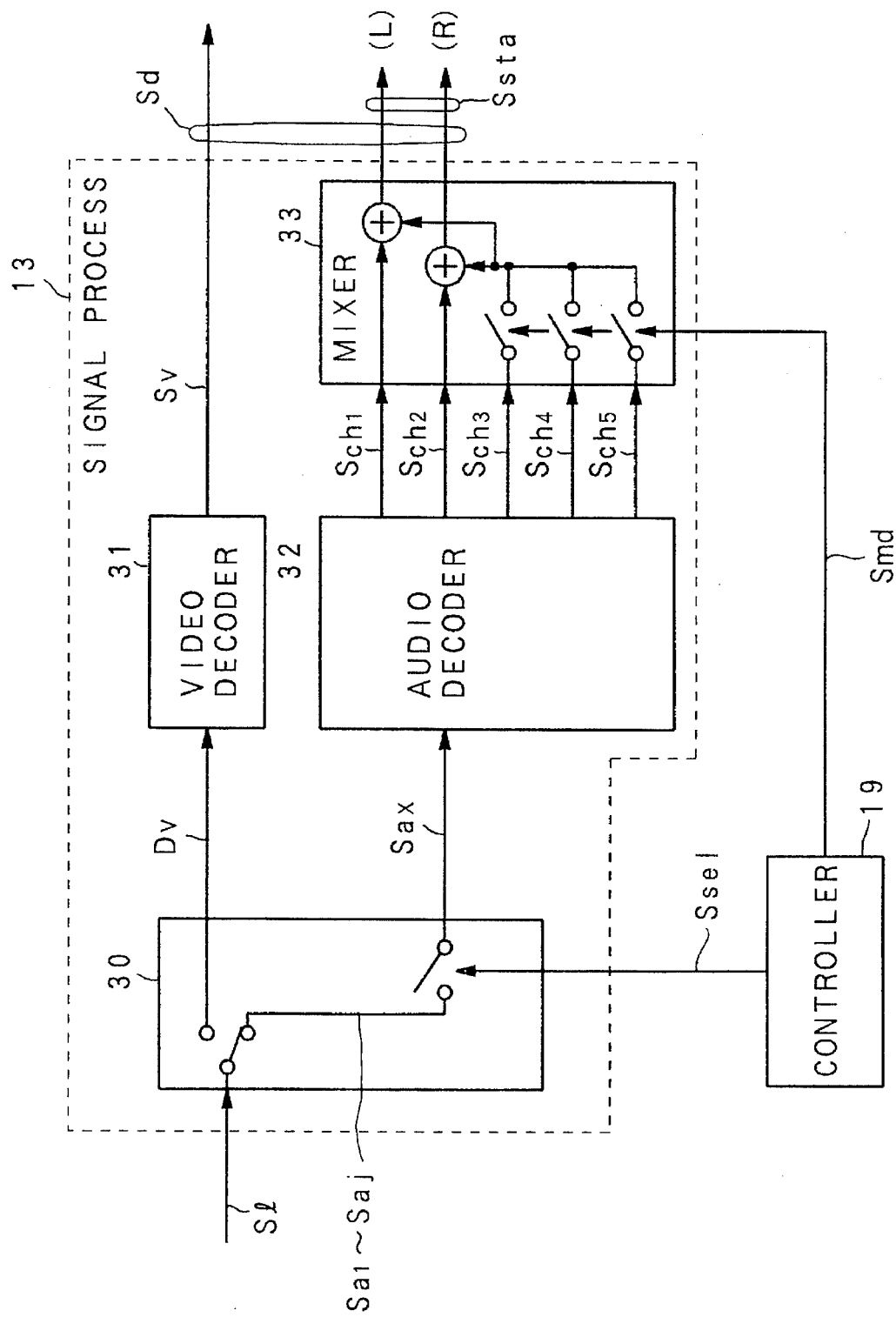
FIG. 7 is a block diagram of a signal process section and a controller in the information reproducing apparatus of FIG. 6.

The constructions of the signal process section 13 and the controller 19 are explained in detail with referring to FIG. 7.

In FIG. 7, the signal process section 13 is provided with: a demultiplexer 30 for separating video data Dv and the desirable audio stream Sax from the reproduction signal S1 on the basis of a stream selection signal Sse1 from the controller 19; a video decoder 31 for decoding the video data Dv to output it as a video signal Sv; an audio decoder 32 for decoding the audio stream Sax separated by the demultiplexer 30 to output $1^{st}$ to $5^{th}$ channel audio signals Sch1 to Sch5; and a mixer 33 for mixing-down the $1^{st}$ to $5^{th}$ channel audio signals Sch1 to Sch5 on the basis of a mix-down control signal Smd from the controller 19, and outputs it as a stereo audio signal Ssta of 2 channels (i.e. L (Light) channel+R (Right) channel).

In this case, the video signal Sv and the stereo audio signal Ssta constitute the output signal Sd.

The operation section 20 is provided with a plurality of switches for the user to input various instructions and a display panel to display various operation conditions of the information reproducing apparatus 200.

Next, the operation of the above described information reproducing apparatus 200 will be explained with referring to FIGS. 8 and 9.

Here, the explanation will be made on an assumption that the audio content information data are composed of 8 byte data based on the AC3 standard, and that all types of audio information are recorded so as to enable all possible combinations of them.

Figure 9:
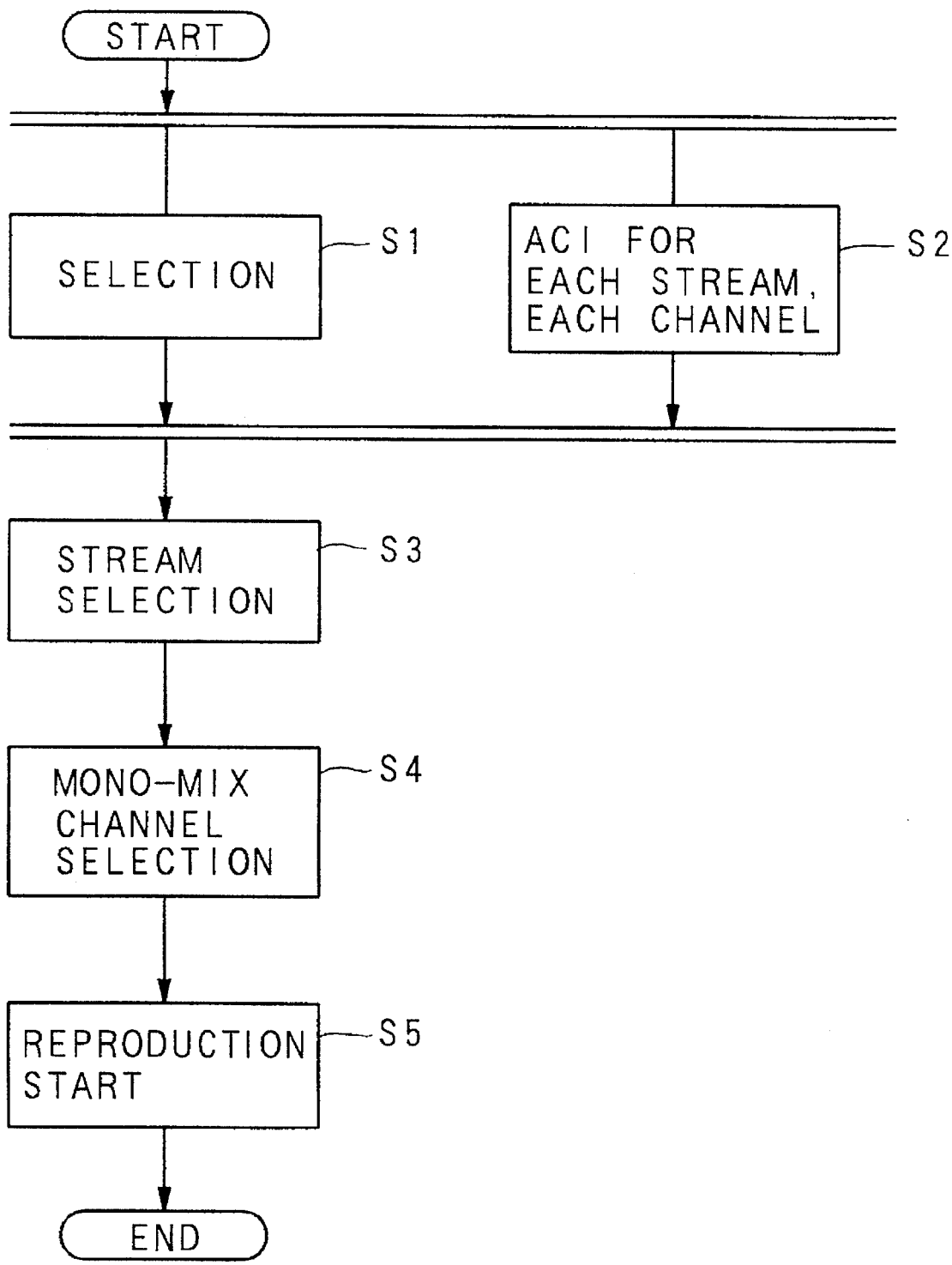
FIG. 9 is a flow chart of an operation of the embodiment.

In FIG. 9, firstly, as the user operates selection switches SW1 to SW3 shown in FIG. 8 which are equipped on an operation panel of the operation section 20 of FIG. 6, the vocal selection, the pro-version selection and the selection of adding the effective sound are performed (step S1).

In this case, the vocal selection is an operation for selecting at least one of the $1^{st}$ vocal audio V1 and the $2^{nd}$ vocal audio V2 as an object of reproduction.

More concretely, in case of a solo music composition, as the user operates the selection switch SW1, the existence of the vocal is selected in such a cyclic manner that "vocal audio ON→vocal audio OFF→vocal audio ON→...". In case of a duet music composition, as the user operates the selection switch SW1, the combination of the vocal is selected in such a cyclic manner that "$1^{st}$ vocal audio V1 OFF+$2^{nd}$ vocal audio V2 OFF→$1^{st}$ vocal audio V1 ON+$2^{nd}$ vocal audio V2 OFF→$1^{st}$ vocal audio V1 OFF+$2^{nd}$ vocal audio V2 ON→$1^{st}$ vocal audio V1 ON+$2^{nd}$ vocal audio V2 ON→$1^{st}$ vocal audio V1 OFF+$2^{nd}$ vocal audio V2 OFF→...".

The pro-version selection is such a selection operation that the $1^{st}$ guide melody GM1 (or the $2^{nd}$ guide melody GM2) is not an object for reproduction.

More concretely, in case of a solo music composition, as the user operates the selection switch SW2, the existence of the guide melody is selected in such a cyclic manner that "guide melody OFF→guide melody ON→guide melody OFF→...". In case of a duet music composition, as the user operates the selection switch SW2, the combination of the guide melody is selected in such a cyclic manner that "$1^{st}$ guide melody GM1 OFF+$2^{nd}$ guide melody GM2 OFF→$1^{st}$ guide melody GM1 ON+$2^{nd}$ guide melody GM2 OFF→$1^{st}$ guide melody GM1 OFF+$2^{nd}$ guide melody GM2 ON→$1^{st}$ guide melody GM1 ON+$2^{nd}$ guide melody GM2 ON→$1^{st}$ guide melody GM1 OFF+$2^{nd}$ guide melody GM2 OFF→...".

The selection of adding the effective sound is an operation to select whether or not the effective sound such as a clapping sound or the like is added if the effective sound is included in the $3^{rd}$ to $5^{th}$ channels.

More concretely, as the user operates the selection switch SW3, the existence of the effective sound is selected in such a cyclic manner that "effective sound OFF→effective sound ON→effective sound OFF→...".

It is also possible to construct the information reproducing apparatus 200 such that the existence of the introduction, the existence of the chorus and the version of the main performance are selected by switches in the same manner, although it is not illustrated in FIG. 8.

In FIG. 9 again, in parallel to the selection of the performance (S1), the controller 19 refers to the audio content information (ACI) data for each stream and each channel (step S2). In this case, since the controller 19 recognizes that all types of audio information possible to be recorded are actually recorded on the optical disk DK, the controller 19 permits an arbitrary selection by the user such that any combination of the audio information can be selected.

The selection condition at this time is displayed on a display DSP shown in FIG. 8. The controller 19 performs a display on the display DSP only as for the combinations of the audio information which are permitted for the user, on the basis of the audio content information data.

Then, the controller 19 selects the stream Ss corresponding to the operation conditions of the selection switches SW1 to SW3, by controlling the demultiplexer 30 by the stream selection signal Sse1 (step S3).

Next, a case will be explained where a duet music composition is to be sung by a man, the pro-version (i.e. no guide melody) is selected, and the effective sound is added.

In this case, for example, it is assumed that, in the $1^{st}$ audio stream Sa1, the ordinary main performance is recorded to the $1^{st}$ and $2^{nd}$ channels Sch1 and Sch2, the $1^{st}$ guide melody corresponding to the $1^{st}$ vocal voice for man and the $2^{nd}$ guide melody GM2 corresponding to the $2^{nd}$ vocal voice for woman are recorded to the $3^{rd}$ channel Sch3, the $1^{st}$ vocal V1 for man is recorded to the $4^{th}$ channel Sch4, and the $2^{nd}$ vocal V2 for woman is recorded to the $5^{th}$ channel Ssh5.

Further, it is assumed that, in the $2^{nd}$ audio stream Sa2, the ordinary main performance is recorded to the $1^{st}$ and $2^{nd}$ channels Sch1 and Sch2, the $1^{st}$ vocal V1 for man and the $2^{nd}$ guide melody GM2 corresponding to the $2^{nd}$ vocal voice for woman are recorded to the $3^{rd}$ channel Sch3, the $2^{nd}$ vocal V2 for woman and the $1^{st}$ guide melody GM1 corresponding to the $1^{st}$ vocal voice for man are recorded to the $4^{th}$ channel Sch4, and the effective sound is recorded to the $5^{th}$ channel Ssh5.

Furthermore, it is assumed that, in the $3^{rd}$ audio stream Sa3, the main performance with the effective sound is recorded to the $1^{st}$ and $2^{nd}$ channels Sch1 and Sch2, the $1^{st}$ guide melody GM1 corresponding to the $1^{st}$ vocal voice for man and the $2^{nd}$ guide melody GM2 corresponding to the $2^{nd}$ vocal voice for woman are recorded to the $3^{rd}$ channel Sch3, the $1^{st}$ vocal V1 for man is recorded to the $4^{th}$ channel Sch4, and the $2^{nd}$ vocal V2 for woman is recorded to the $5^{th}$ channel Sch5.

Under this assumption, the user operates the selection switches Sw1 to SW3, so that the desirable condition for the user is set.

The controller 19 judges that the audio information requested to be outputted is the main performance, the second vocal V2 for woman and the effective sound according to the request (i.e. the switch selection) by the user, and selects the appropriate stream which satisfies this request (step S3).

More concretely, since the effective sound is not recorded to the $1^{st}$ audio stream Sa1, the controller 19 judges that the $1^{st}$ audio stream Sa1 is not appropriate here.

Although the effective sound and the $2^{nd}$ vocal V2 for woman are recorded to the $2^{nd}$ audio stream Sa2, since the $2^{nd}$ vocal V2 for woman and the $1^{st}$ guide melody GM1 are mixed in recording and since the $2^{nd}$ vocal V2 cannot be independently read out therefrom, the controller 19 judges that the $2^{nd}$ audio stream Sa2 is not appropriate.

Since the $2^{nd}$ vocal V2 for woman is independently recorded to the $5^{th}$ channel Sch5 and the effective sound is also recorded on the main performance in the $3^{rd}$ audio stream Sa3, the controller 19 judges that the $3^{rd}$ audio stream Sa3 is appropriate i.e. the most suitable for the request by the user.

By this, the audio decoder 32 decodes the $3^{rd}$ audio stream Sa3, which has been separated by the demultiplexer 30, and outputs it to the mixer 33 as the $1^{st}$ to $5^{th}$ channel audio signals Sch1 to Sch5.

Then, the controller 19 sends the mix-down control signal Smd to the mixer 33 so as to select the channels, which are to be mixed-down by the mixer 33 (step S4).

In this example, the $5^{th}$ channel audio signal Sch5 is to be mixed-down onto the $1^{st}$ and $2^{nd}$ channel audio signals Sch1 and Sch2.

Correspondingly, the mixer 33 mixes-down the $1^{st}$ to $5^{th}$ channel audio signals Sch1 to Sch5 on the basis of the mix-down control signal Smd from the controller 19, and outputs the stereo audio signal Ssta of 2 channels (i.e. L channel+R channel). In parallel to this process, the video decoder 31 decodes the video data Dv and outputs it as the video signal Sv (step S5).

Other than the above described examples, the information reproducing apparatus 200 can deal with various cases, by selecting three audio streams described by the above embodiment and by combining each channel in the selected audio stream. Here, various cases, which can be dealt with by the embodiment, are summarized in FIG. 10.

In FIG. 10A, the audio information recorded to each channel and the corresponding purpose of usage as for the $1^{st}$ audio stream Sa1 are indicated. In FIG. 10B, the audio information recorded to each channel and the corresponding purpose of usage as for the $2^{nd}$ audio stream Sa2 are indicated. In FIG. 10C, the audio information recorded to each channel and the corresponding purpose of usage as for the $3^{rd}$ audio stream Sa3 are indicated. In FIGS. 10A to 10C, each of small circles "o" indicates an output channel respectively.

From FIGS. 10A to 10C, it is clearly understood that various cases can be dealt with by the present embodiment.

As described above in detail, according to the present embodiment, even if the number of possible combinations of the audio information recorded on the optical disk DK at the time of reproduction is enormous, it is not necessary to set the information as for the combination of the audio information, which is possible to be reproduced, in advance. It is possible to easily specify the combination of the audio information to be reproduced on the basis of the audio content information data, which is recorded on the optical disk DK. And that, the flexibility in constructing the recording and reproducing system can be certainly improved, according to the present embodiment.

In the above explanations, the cases based on the AC3 standard has been explained. However, the present invention is not limited to this, but may be adapted to some other standard such as the linear PCM, the MPEG2 and the like, as long as the standard is capable of the multiple channel recording operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for recording onto a recording medium groups of audio information data, the audio information data corresponding to M (M: a natural number) kinds of audio information arbitrarily selected from N (N: a natural number not less than 3, and M≦N) kinds of audio information, said apparatus comprising:

a data generating device for generating record content information data identifying the selected M kinds of audio information; and recording means for recording on the recording medium the generated record content information data and the groups of audio information data.

2. An apparatus according to claim 1, wherein the recording means records one piece of the generated record content information data commonly for a plurality of audio information data groups comprising the same kinds of audio information.

3. An apparatus according to claim 1, wherein the recording means records a plurality of pieces of record content information data corresponding to a plurality of groups of audio information data collectively within a predetermined area on the record medium.

4. An apparatus according to claim 1, wherein the recording means records a plurality of pieces of record content information data corresponding to a plurality of groups of audio information data such that each piece of record content information data is added to one of the groups of audio information data corresponding to said each piece of record content information data, respectively.

5. An apparatus according to claim 1, wherein said recording means comprises an adder for adding the record content information data to the groups of audio information data, a modulator for modulating the added data, and a mastering device for recording the modulated data onto the record medium.

6. An apparatus for reproducing information data in the form of an arbitrary combination of M (M: a natural number) kinds of audio information from a recording medium, the information data comprising (i) audio information data corresponding to the M kinds of audio information arbitrarily selected from N (N: a natural number not less than 3, and $M \leq N$) kinds of audio information, the audio information data being recorded as groups of audio information data corresponding to the selected M kinds respectively, and (ii) record content information data identifying the selected M kinds of audio information the apparatus comprising:

reading means for reading the groups of audio information data and the record content information data from the recording medium;

identifying means for identifying on the basis of the record content information data read by the reading means the M kinds of audio information corresponding to the groups of audio information data read by the reading means;

instructing means for selecting a combination of the M kinds of audio information to be reproduced; and signal processing means for extracting the audio information data corresponding to the selected combination to be reproduced, and reproducing the extracted audio information data.

7. An apparatus according to claim 6, wherein the signal processing means comprises a demultiplexer for extracting the audio information data corresponding to the selected combination, an audio decoder for decoding the extracted audio information data, and a mixer for mixing-down the decoded audio information data.

8. An apparatus according to claim 6, further comprising a display means for displaying a message corresponding to the M kinds of audio information identified by the identifying means.

9. An apparatus for reproducing from a recording medium information data in a form of an arbitrary combination of $M_1, \ldots, M_L$ ($M_1, \ldots, M_L$: a natural number, L: a natural number) kinds of audio information, the information data comprising (i) audio information data corresponding to the $M_1, \ldots, M_L$ kinds of audio information each arbitrarily selected from N (N: a natural number not less than 3, and $M_1, \ldots, M_L \leq N$) kinds of audio information, each recorded as groups of audio information data corresponding to the selected $M_1, \ldots, M_L$ kinds respectively, and (ii) L pieces of record content information data to respectively identify the selected $M_1, \ldots, M_L$ kinds of audio information, the apparatus comprising:

first instructing means for selecting the group of audio information data to be reproduced;

reading means for reading from the recording medium the selected group of audio information data and the record content information data corresponding to the selected group of audio information data;

identifying means for identifying the audio information constituting the group of audio information data read by said reading means on the basis of the record content information data read by said reading means;

second instructing means for selecting a combination of the $M_1, \ldots, M_L$ kinds of audio information constituting the group of audio information data to be reproduced; and signal processing means for extracting from the group of audio information data read by said reading means the audio information data corresponding to the selected combination to be reproduced, and reproducing the extracted audio information data.

10. An apparatus according to claim 9, wherein the signal processing means comprises a demultiplexer for extracting the audio information data corresponding to the selected combination, an audio decoder for decoding the extracted audio information data, and a mixer for mixing-down the decoded audio information data.

11. An apparatus according to claim 9, further comprising display means for displaying a message corresponding to the audio information identified by the identifying means.

* * * * *